US011375590B2

(12) United States Patent
DeMayo et al.

(10) Patent No.: US 11,375,590 B2
(45) Date of Patent: Jun. 28, 2022

(54) AUTO-GRADIENT COMBINATIONS FOR PIXEL COMPENSATION

(71) Applicant: LiteGear, inc., Burbank, CA (US)

(72) Inventors: Albert DeMayo, Santa Clarita, CA (US); Alejandro Vazquez, Monrovia, CA (US); Lee Ford Parker, Turlock, CA (US); Thomas Kong, Los Angeles, CA (US); Michael Wagner, Santa Clarita, CA (US)

(73) Assignee: LiteGear, Inc., Burbank, CA (US)

( * ) Notice: Subject to any disclaimer, the term of this patent is extended or adjusted under 35 U.S.C. 154(b) by 0 days.

(21) Appl. No.: 17/222,832

(22) Filed: Apr. 5, 2021

(65) Prior Publication Data

US 2021/0315074 A1 Oct. 7, 2021

Related U.S. Application Data

(60) Provisional application No. 63/006,353, filed on Apr. 7, 2020.

(51) Int. Cl.
*H05B 45/14* (2020.01)
*H05B 45/20* (2020.01)
*G03B 15/03* (2021.01)
*F21S 4/24* (2016.01)
*F21S 4/26* (2016.01)
*F21Y 103/10* (2016.01)
*F21Y 115/10* (2016.01)

(52) U.S. Cl.
CPC .............. *H05B 45/14* (2020.01); *F21S 4/24* (2016.01); *F21S 4/26* (2016.01); *G03B 15/03* (2013.01); *F21Y 2103/10* (2016.08); *F21Y 2115/10* (2016.08); *H05B 45/20* (2020.01)

(58) Field of Classification Search
None
See application file for complete search history.

(56) References Cited

U.S. PATENT DOCUMENTS

| | | | |
|---|---|---|---|
| 6,270,228 B1 | 8/2001 | Axen et al. | |
| 7,952,581 B2 | 5/2011 | Lehenbauer et al. | |
| 8,324,826 B2 | 12/2012 | Verberkt et al. | |
| 8,373,366 B2 | 2/2013 | Baaijens et al. | |
| 9,655,195 B2 | 5/2017 | Tseng et al. | |
| 10,375,264 B2 | 8/2019 | Debevec et al. | |

(Continued)

*Primary Examiner* — Anh Q Tran
(74) *Attorney, Agent, or Firm* — Socal IP Law Group LLP; Angelo Gaz

(57) ABSTRACT

A luminaire adapted to apply an auto-gradient effect across pixels has an interface coupled by a connection to a controller. The controller has electronic circuitry that receives a predetermined start light parameter for a start pixel of a luminaire and receives a predetermined end light parameter for an end pixel of the first luminaire, the predetermined end light parameter greater than the predetermined start light parameter. The controller circuitry then automatically interpolates a gradient effect for a middle light parameter of each of a plurality of middle pixels of the luminaire based on the start and end predetermined light parameters. The controller circuitry then outputs control signals having the start, end and middle light parameters to the start, end and middle light pixels, respectively, through the connection and to the interface.

23 Claims, 11 Drawing Sheets
(6 of 11 Drawing Sheet(s) Filed in Color)

(56) References Cited

U.S. PATENT DOCUMENTS

2018/0352629 A1\* 12/2018 Crosbie .................... F21K 9/27
2019/0082515 A1  3/2019 DeMayo et al.
2019/0342983 A1\* 11/2019 Meerbeek ............ H05B 47/105

\* cited by examiner

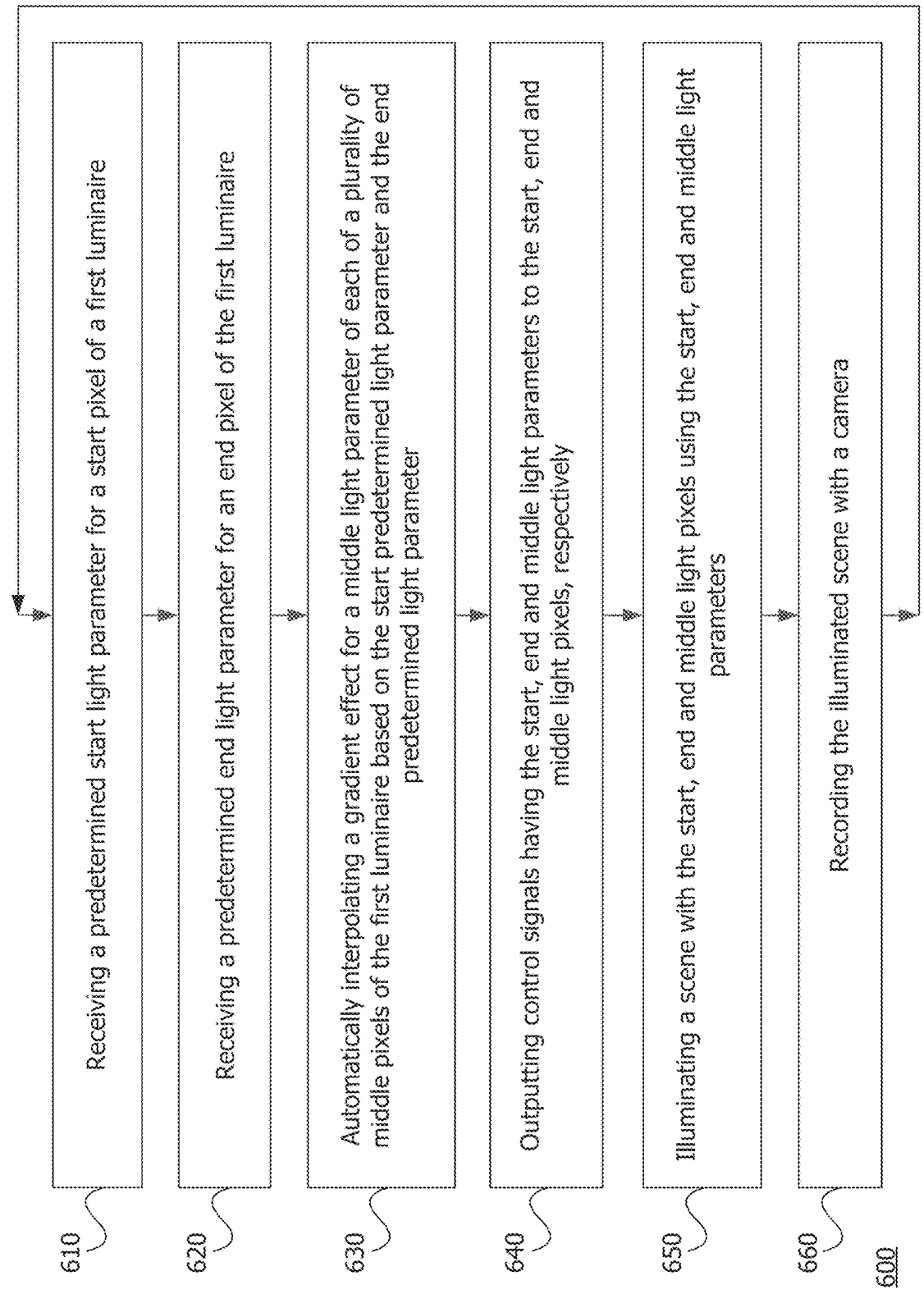

AUTO-GRADIENT COMBINATIONS FOR PIXEL COMPENSATION

RELATED APPLICATION INFORMATION

This patent claims priority to and incorporates by reference U.S. provisional patent application No. 63/006,353, titled AUTO-GRADIENT PIXEL, filed Apr. 7, 2020.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

The disclosure relates to systems and processes for compensation of light produced by artificial light sources and light sensed by cameras.

Description of the Related Art

Various types of artificial light sources are currently used in motion picture and television fields or industries. Systems and processes are used to control compensation of light produced by artificial light sources and light sensed by digital camera light sensors, or light sensed by conventional film cameras using conventional film stock so that the resulting object image light mimics natural light when viewed by humans on media such as television, motion pictures and computer monitors. One goal of the present systems and processes is to compensate for artificial light sources and for digital camera sensors, as well as for conventional cameras/film stock so that the object image shown on the display appears to the human viewer to have the same hue, intensity, and saturation value as does the actual object when illuminated by natural light.

Light emitting diodes (LEDs) in the form of LED strips have been used in the motion picture and television fields. The strips are sometimes referred to as tapes because they often have a thin, narrow substrate. Plural strips are sometimes assembled into an array, referred to as an LED strip array. Plural strips may also be joined end to end, or bussed.

The light output from typically available luminaires varies in intensity and color, depending on the technology used, such as incandescent, fluorescent, LED, high intensity discharge, etc. Even within the same technology variations from one luminaire to another are common. For example, variations in color and intensity of light are very noticeable even when comparing a new bulb to a same technology bulb made by the same manufacturer and that is at or near its end of life. Several fixtures from differing technologies are often used to illuminate a movie set and the people and objects on the set. In recording any scene on the set, one typical goal is to have the light look as if it is emitted from an identical or similar source. In order to achieve this "similar source look" lighting technicians typically rely on conventional mechanical devices that assist in diminishing the luminance from a particular light source, or they modify the color emitted and as required for a particular shot.

However, conventional such LED lighting products suffer from several drawbacks or problems. Those problems include the need for complicated control systems to achieve a sufficient level of pixel control of the LEDs. The complication of the control system is multiplied when controlling multiple LED strips. This complication is further compounded when adjusting intensity, color temperature, correlated color temperature (CCT), saturation, accent color and tint of pixels of each LED strip as desired.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 is a flow chart showing an operating environment or a process for applying an auto-gradient effect across pixels.

Figure 1:
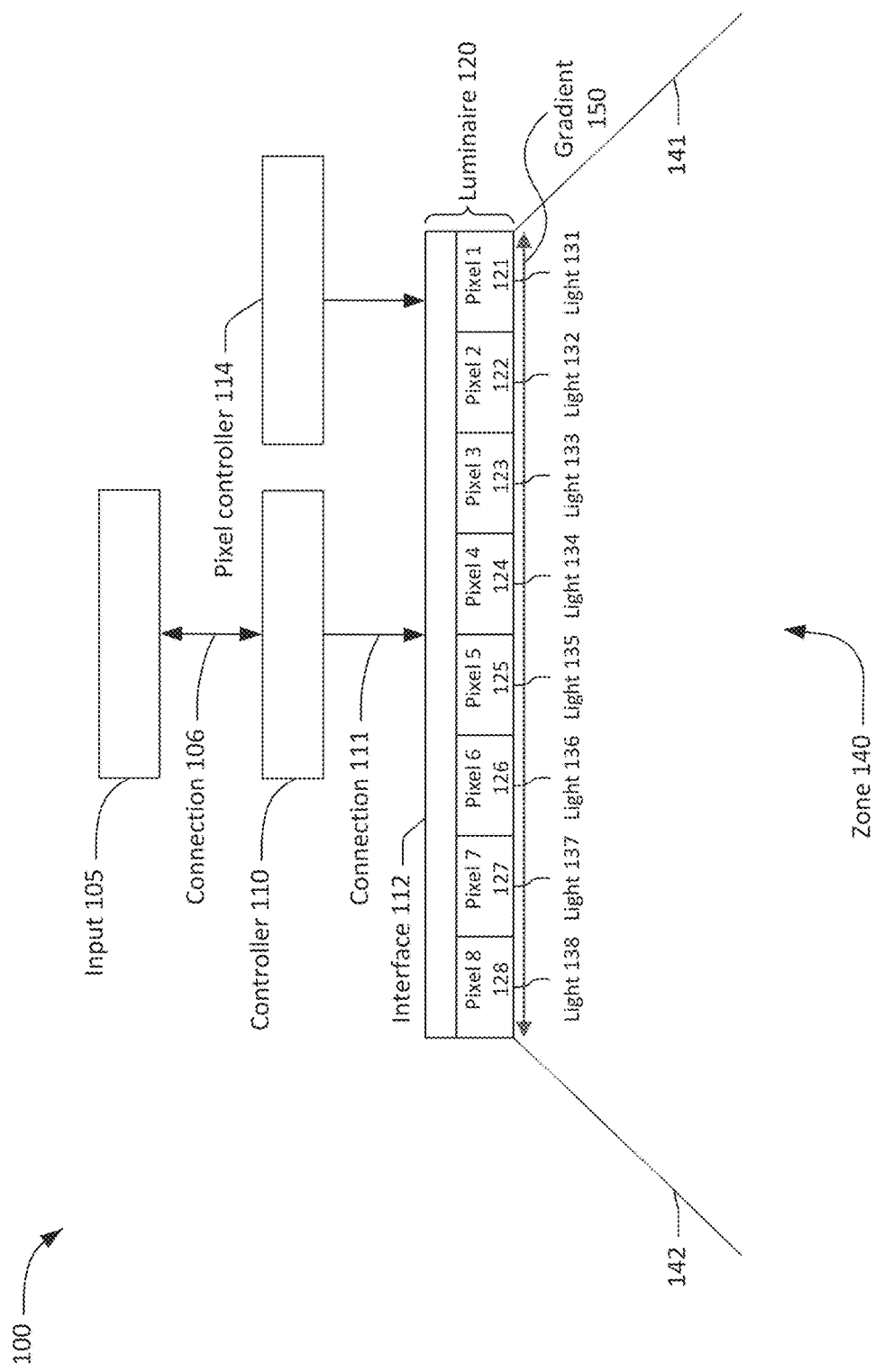
FIG. 1 is a block diagram of a lighting system for applying an auto-gradient effect.

Throughout this description, elements appearing in figures are assigned three-digit or four-digit reference designators, where the two least significant digits are specific to the element and the one or two most significant digit is the figure number where the element is first introduced. An element that is not described in conjunction with a figure may be presumed to have the same characteristics and function as a previously-described element having the same reference designator or the same two least significant digits.

DETAILED DESCRIPTION

This patent describes luminaires, systems and processes for applying a gradient effect across pixels (light emitting zones) of either a single luminaire (with multiple zones) or multiple luminaires (each with multiple zones) in the same system. Each luminaire consists of some number of pixels. The minimum number of pixels needed to apply a gradient is three pixels, as a start pixel and end pixel are needed to interpolate the data for the gradient, which would be applied to the remaining pixels (i.e., at least one) beyond the start and end pixels. The gradient could be a gradient of one or more of several parameters, including, but not limited to, intensity, color temperature, saturation, hue, and tint. Implementing a gradient of one of the aforementioned does not preclude the implementation of another. Gradients of several parameters may be applied simultaneously.

The process may be performed by a luminaire or system having a gradient mode that enables the practical use of multiple pixels in local mode and further empowers digital multiplex interface (DMX) controlled pixel use. This feature auto-calculates the values of several middle pixels by evaluating the first and last pixels. Within the luminaire and without a full pixel controller, the middle pixels are averaged to values in between first and last, creating a gradient having gradual transitions. A user can adjust intensity, correlated color temperature (CCT), saturation, accent color and tint as desired.

The system may implement the gradient mode in a single device or luminaire that includes the controller, and interface to the pixels and the pixels, such as in a light strip, light bar etc. The calculations to achieve the gradient can take place internally in the fixture that can provide the gradient desired. Start and end pixel light parameters can be entered on an input device and sent to a controller located withing the luminaire that automatically calculates the gradient effect for the middle pixels. In some cases, the controller is in an external device, such as a dimmer or a DMX board, that can provide the gradient desired. The gradient is interpolated by the controller without the use of a full pixel controller. The controller may be a mini-controller in the sense that it is not a full pixel controller.

Term "luminaire" refers to a complete light source, a light emitting device or a light fixture including the controller. The term luminaire may refer to light emitting diodes (LEDs), LED strips, LED tapes, LED strip arrays, and LED strip busses.

In the lighting field, the term intensity refers to the brightness of a light source, the term luminance refers to the intensity of light per unit area in a given direction. The various white colors associated with a specific Kelvin (K) temperature are typically referred to as correlated color temperature (CCT). Also, the term "color" refers to and includes the concepts of "hue" or what is generally referred to as the color of something, the intensity, and the degree of "saturation" of a color, which means the degree or amount of white light that is mixed with some other color. Tint is a mixture of a color with white, which increases lightness. A pixel has LEDs for mixing colors. The Pixels may include red, green, blue (RGB), amber (A), cool white and/or warm white LEDs. In some cases, the LEDs of a pixel are only one color or are only RGB.

Referring now to FIG. 1, there is shown a block diagram of a lighting system 100 for applying an auto-gradient effect across pixels of at least one luminaire. The system 100 has input device 105 connected through connection 106 to controller 110 which is connected through connection 111 to luminaire 120. Luminaire 120 is shown with 8 pixels total, though many more may be used. Interface 112 is attached to each of the 8 pixels that are pixel 1 or 121 to pixel 8 or 128. Each of pixels 1-8 outputs corresponding light or light emitting zones of light 131-138 which illuminates zone 140 between start frame 141 and end frame 142. The luminaire and frames may be oriented horizontally, at an angel or vertically.

Pixel 1 is a start pixel and pixel 8 is an end pixel. Zone 140 may be for illuminating a scene (e.g., one or more frames) between frames 141 and 142. A frame is a two dimensional or three dimensional image at a point in time. A scene is a sequence of frames over time such as a scene of video images. Gradient effect 150 is the light parameter change from light 131 to light 138. It is based on start, end and middle light parameters determined by controller 110 using the inputs from input 105. The gradient effect includes an interpolated gradient effect for middle light parameters of middle pixels 122-127 based on the light parameters received for start pixel 1 and end pixel 8.

The input 105 is in a different device than controller 110. The controller 110 and connection 111 are shown separate from the luminaire 120. However, the controller 110, connection 111, interface 112 and pixels may all be part of a single device that is luminaire 120. The system 100 may include more than one set of controllers, connections and luminaires. In some cases, controller 110 controls multiple luminaires 120 using multiple connections 111. The system 100 may also include full control capable pixel controller 114 which sends control signals to fully control of each pixel of a luminaire without the use of controller 110.

The input 105 allows a user to set the light parameter of the start pixel 1 and end pixel 8 of luminaire 120. Those parameters are sent by the input device on connection 106 to the controller 110. Those parameters may be the only data sent by the input to the controller. Input 106 does not have the ability to send control signals directly to luminaire 120 that fully control of each pixel, without the use of controller 110 to extrapolate the middle pixel gradient.

The input 105 can have a graphical user interface (GUI) that allows the user to set and view the start and end parameters via a combination of encoders, buttons, and a display. The view of the parameters can include viewing of the calculated parameters of the middle pixels and/or of gradient 150 which are provided by controller 110 back through connection 106 to the input device. Other hardware could be used for the input, such as a capacitive or resistive touch screen or potentiometers, for example or DMX compatible controllers.

The start and end pixel light parameters are received by the controller 110 and used to interpolate a gradient by calculating the light parameters of middle pixels. Controller 110 may be located within the luminaire to automatically interpolated gradient 150 for the middle pixels 2-7. The controller 110 allows a user to efficiently create gradient 150 by setting at the input 105 only the light parameter of the start pixel 1 and end pixel 8 of luminaire 120. Upon interpolating the gradient, controller 110 sends control signals having the light parameters of the start, end and interpolated middle pixels through the connection 111 to the interface. The control signals control the pixels 1-8 to output lights 131-138, respectively.

The control signals may control the amount of power going to various pixels or LEDs of pixels, such as by controlling switches or power circuitry. The control signals may be an amount of electrical power to power the pixels or LEDs of the pixels. In another case, the control signals limit the numbers of LEDs that turn on for each pixel in the luminaire to illuminate a scene. For example, on pixel A all LEDs will turn on at 100% intensity to create Intensity A=100%, on pixel Z 15% of the LEDs will turn on at full intensity to create Intensity Z=25%. The control signals created can automatically turn on the respective number of LEDs (75%, 50%, 25%, etc..) at full brightness on each of the middle pixels to create a natural light drop-off.

The interpolated gradient can be used to create linear, non-linear, curve, exponential, and logarithmic gradients. The user may set at the input and the controller 110 may interpolate gradient 150 for multiple light parameters such as intensity (e.g., light brightness), color temperature, saturation, hue, tint, color frequency, CCT (e.g., warm white to cool white) and color gradients. The user may set at the input and the controller may interpolate gradient 150 for multiple luminaires. The multiple luminaires may be controlled with multiple light parameters.

The controller may be implemented by hardware logic, software or a combination of both. In some cases, it is not software but only hardware logic such as PCB, electrical circuits, traces, ICs, ROM and/or other hardware circuitry. It may be electronic circuitry, such as electrical circuits, resistors, transistors, inductors, capacitors, traces, ICs, ROM and/or other hardware electronic circuitry to perform the functions described.

Connection 111 may have a forward connection for sending control or data signals from controller 110 to the interface 112 to control the pixels 1-8 to output light 131-138. This connection may also send electrical power to the interface for illuminating the pixels. The connection 111 may have backward connection for providing unique identifications of the pixels from the interface to the controller.

The interface 112 connects connection 111 to each of the pixels so that the control signals from the controller are received by each pixel. In some cases, the connection 111 and interface 112 are both part of the luminaire, such as where the controller is mounted to the interface. Also, the connection 111 may start as one connection at controller 110 and then split to becomes 8 connections that are each attached to a pixel. In another case, connection 111 is 8 separate connections from the controller to each of the pixels.

Each pixel may be one or more light emitting zones, such as one or more LEDs. Each pixel may be uniquely identified to the controller using the connection. Each pixel may have a unique identifier (ID). A pixel could be an entire light engine with multiple LEDs that act as a unit when controlled to change color, intensity or other light parameters, such as by receiving multiple control signals from controller 110. These pixels (light engines) are then tiled together into pixels 1-8 to achieve the gradient desired. In other cases, a subset of pixels 1-8 may be used to form a separate gradient by picking start and/or end pixels withing pixels 1-8. For example, a pixel can be a single emitter (e.g., LED) that responds independently of others within the string or array of LEDs based on its single control signal. In this case, the single pixel may be the start and end pixel and a subset of pixels 1-8. The subset can be used to set gradients by using more than just two color points of start pixel 1 and end pixel 8.

In one system, the controller 110 polls the system 100 to identify luminaires and pixels in the system. The controller may do this via a serial data pair of connection(s) 111 that connects the luminaire(s) to the controller, manually, or by other means. The input 105 has a graphical user interface (GUI) that allows the user to set and view parameters via a combination of encoders, buttons, and a display. Power and data can be transferred in the same cable 111, although this is not necessary.

Instead of full pixel control, using controller 110's auto-gradient pixel control allows a limited amount of control, such as more than no pixel control but less than full pixel control, in exchange for simplicity and speed. For example, in situations with no DMX control, there is normally a very limited set of controls (buttons, encoders, etc.) the use of which exacerbates the cumbersomeness of trying to control the gradient of middle pixels. Also, full pixel control can be cumbersome in many situations, especially those situations without advanced controllers. Thus, using the system 100 provides a limited control of interpolating gradient 150 which uses less power, uses less/cheaper equipment and is more efficient, than full pixel control. It uses a limited set of start and end pixel controls at input 105 to automatically set middle pixel values. The system also greatly simplifies pixel control for the user by requiring user to set only start and end pixel parameters to get the gradient effect. The system accomplishes multiple auto-gradient combinations for pixel compensation, such as to compensate for the artificial light source pixels.

Hence the system 100 allows user without complicated or expensive systems to achieve some level of pixel control. System 100 can provide gradient pixel control in general that is useful in film lighting. Examples include situations wherein a light is directed at an actor and that light is to "wrap" around the actor's face, changing intensity as it wraps, as well as others.

Figure 2:
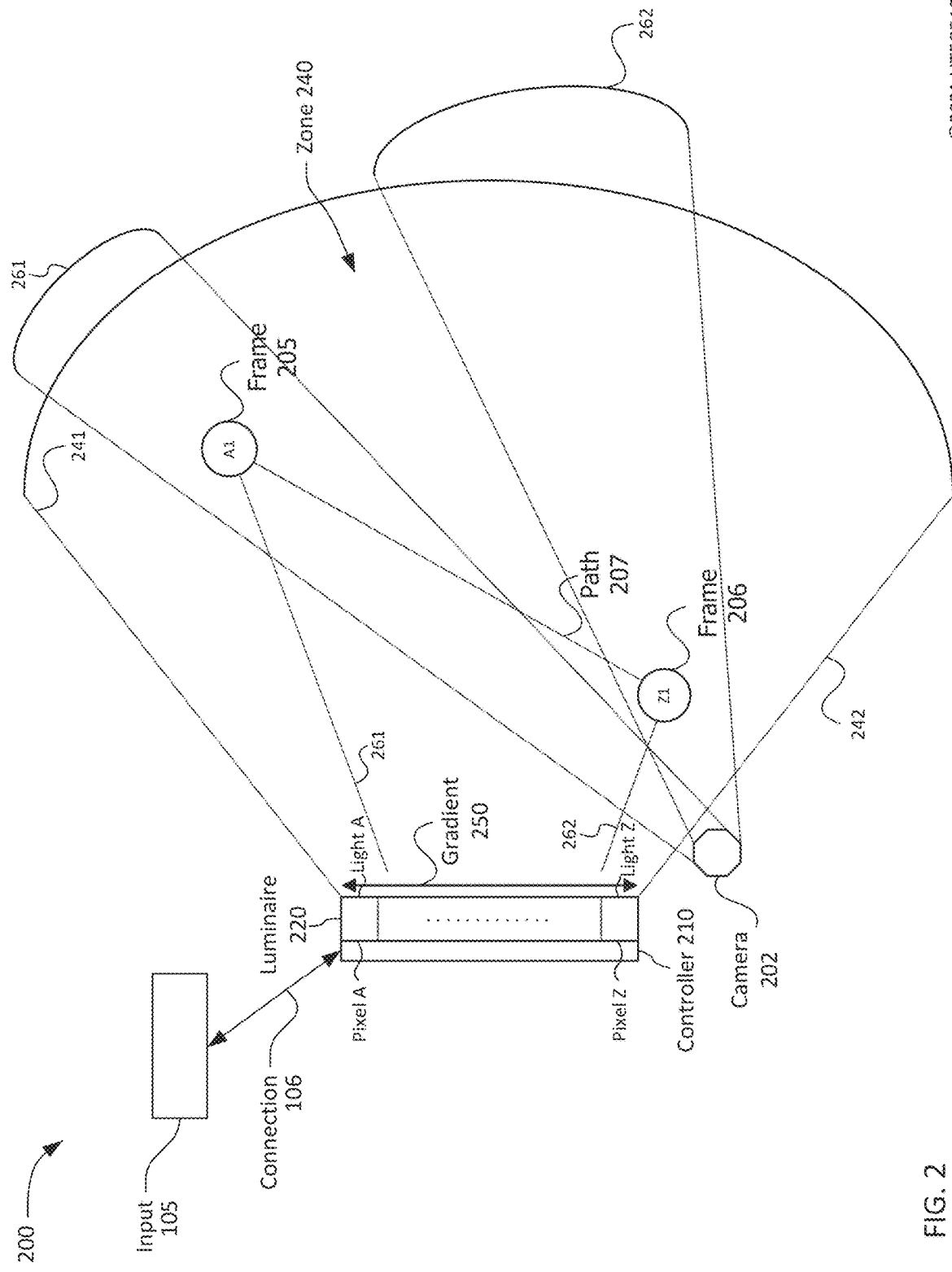
FIG. 2 is a schematic top perspective view of a lighting system for applying a linear auto-gradient effect.

FIG. 2 is a schematic top perspective view of a lighting system 200 for applying a linear auto-gradient effect across pixels of at least one luminaire. The system 200 has input device 105 connected through connection 106 to controller 210. Controller 210 and pixels A-Z are part of luminaire 220. Controller 210 is connected to each of the pixels A-Z. This connection may be through an interface. Each of the pixels outputs corresponding light zones of light A-Z which illuminates total zone of light 240 from left to right between start frame 241 and end frame 242. Camera 202 is for imaging frames 241-242 during a scene having a horizontal zone 240 that is illuminated by system 200.

System 200 has distance 261 from the luminaire to first frame 205 at location A1 and distance 262 from the luminaire to second frame 206 at location Z1. Distance 261 is longer than distance 262. Path 207 leads from frame 205 to frame 207, such as a path an actor may walk or an object may move along on a set or in a scene during three dimensional a scene being illuminated by system 200. Camera 202 records the images (e.g., video) during that transition of path 207 from frame 205 at distance 261 to frame 206 at distance 262, by recording the images having the actor or object in the frames along path 207.

For system 200 (e.g., in an air ambient), light intensity is inversely proportional to the square root of the distance from the pixels to the frame being imaged. In the case where luminaire 220 is to be a soft flat illumination source, with all pixels at the same illumination intensity will be brighter at the second frame 206 than at the first frame 205 because frame 206 is closer to the luminaire than frame 205.

However, system 200 can be used to reduce the illumination (e.g., light intensity or light parameter) gradient from pixel A to pixel Z of pixels of the luminaire proportional to the change in distance from distance 261 to distance 262 so that the intensity along path 207 will appear to maintain a constant illumination as the actor or object moves closer to the camera along the path.

For example, the user or another system may calculate the intensity desired at frame 205 and 206 to maintain a constant illumination along path 207 and input those intensities into input 105 as start and end light parameters. When these parameters are received by controller 210, it uses the input parameters to calculate a linear light gradient 250 of light A to light Z based on start, end and middle light parameters determined by controller 210 as equation (1):

$$iN_p = iA_p - ((N_p - 1) * (iA_p - iZ_p) * (1/(Z_p - 1))) \quad (1)$$

where:
iNp=Intensity of any pixel
iAp=Intensity Pixel A
iZp=Intensity Pixel Z
Np=Given pixel
Nz=Total Pixels Z Thus, the controller is able to interpolate a gradient effect for middle light parameters of middle pixels A+1 to Z−1 based on the parameter of the start pixel A and end pixel Z.

For one example the user inputs:
Intensity A=100%
Intensity Z=25%
Pixel A=1
Pixel Z=8

Thus, for pixel 5, the controller interpolates:

Intensity 5=100%−((5−4)×(75%×(1/7))); or

Intensity 5=100%−(4×10.7413%)=57.14%

Thus, during movement of an actor of object along a path such as path 207, system 200 provides all the benefits noted above for system 100.

It is also possible to calculate a linear light gradient 250 of light A to light Z based on start, end and middle light parameters determined by controller 210 using an equation similar to equation (1) above for a non-linear auto-gradient calculation of intermediate pixels for non-linear, curves, radii, S-curves, exponential, and/or logarithmic gradients. There are always several ways to calculate the non-linear auto-gradient calculation using spherical trigonometry. The results, and how the non-linear auto-gradient calculation may be used, are subject to the "Inverse Square Law" of light. The physical property of light illuminating a surface diminishes by the square of the distance from the source of illumination such that for a source strength S, the intensity at the surface of a sphere with area $4\pi r^2$ surrounding S is $I=S/4\pi r^2$, which is ¼ the intensity at 2r and ⅑ the intensity at 3 r as compared the intensity I at radius r. that is, the illumination energy twice as far from the source is spread out over four times the area, hence one-fourth the intensity.

By using an auto-gradient calculated illumination source or of the luminaire, the intensity of the illumination can be changed to compensation for the loss (or gain) of illumination. A camera can change its exposure setting to compensation for the gain and loss of illumination. In "auto-exposure" or auto-gradient calculation mode with a flash illumination, when the subject is far away (e.g., at frame 205 or 405), the flash illuminates the room and the subject. When the subject is close to the camera (e.g., at frame 206 or 406), the subject "looks" the same, but the room in the background (e.g., path 307) is now black. This is because the intensity of the flash on the subject's face as increased by the distance he has moved closer, squared. Doing this during a filming of a scene in a movie would look very strange, and not at all natural. However, by fixing the exposure on the camera, and creating an auto-gradient of intensity such that the increase and decreases according to the square of the distance from the light source as explained herein, the "appearance" of an even exposure can be achieved. The appearance can also be manipulated using auto-gradient calculation for artistic effect, such as appearing to walk out of darkness into light (e.g., walk from frame 205 or 405 to frame 206 or 406), or vice-versa. Since all colors of light are subject to the same "Inverse Square Law", the same formula that might be applied to intensity, can be applied to intensity of different colors to another, all colors (white light) to no colors (blackness), ergo the similarities of intensity gradients to CCT, tint and hue gradients. People don't notice this in photography during daylight, or at night, because the Sun, Moon, and stars are so far away that the change in distance, even of a few miles, is nothing relative to the 250,000 miles of the Moon, the 93,000,000 miles of the Sun and the billions of miles of the starts. One purpose of auto-gradient calculation control of the luminaire in lighting is to manipulate the limitations of camera, film or digital sensor, and the use of artificial sources to make the artifice of movies and photography appear to be more "real". Often this a not a matter of a specific calculation or series of equations, but by "tweaking" according to the eye of the artist and inputting the proper start, intermediate and/or end light parameters according to the tweaking.

Figure 3:
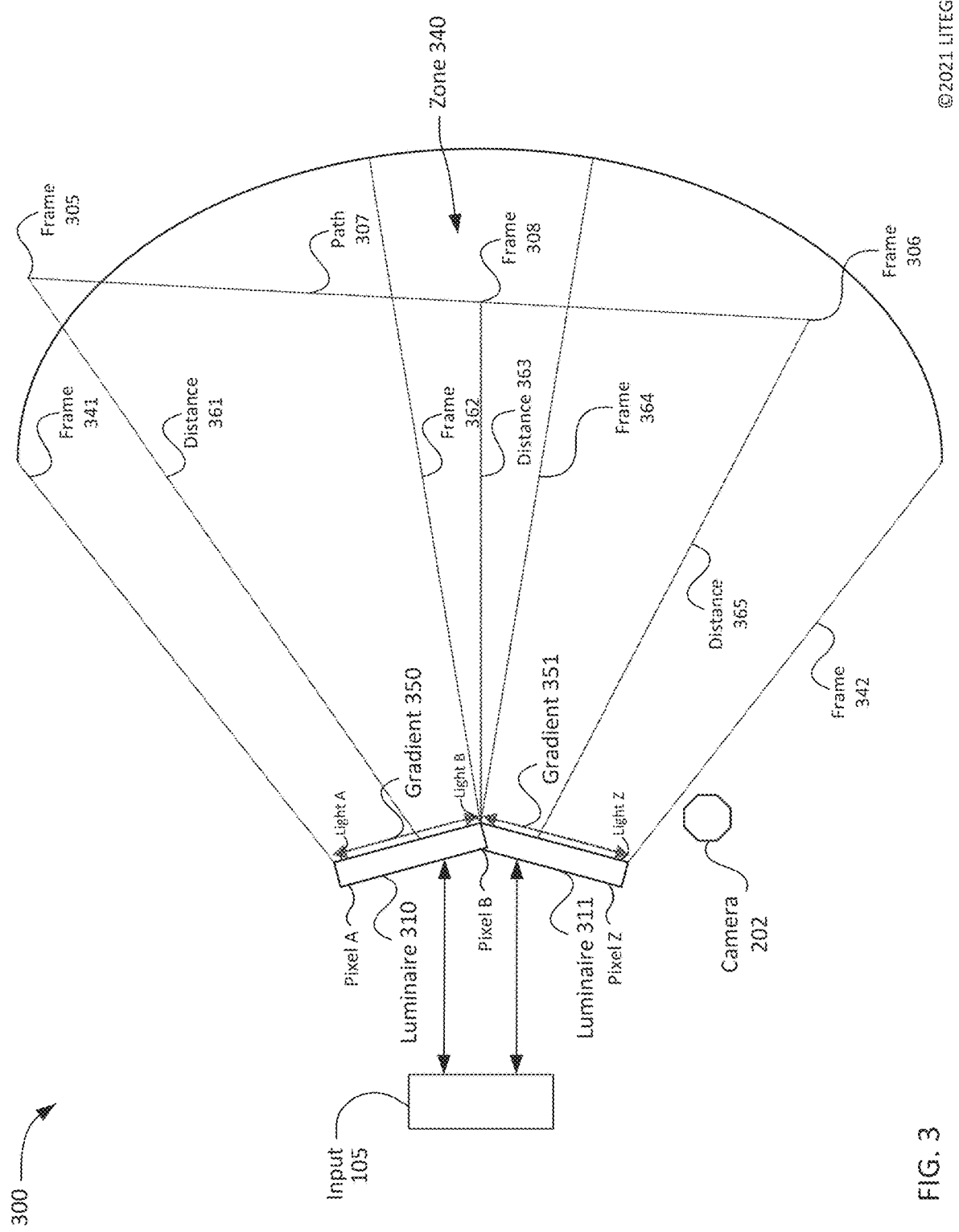
FIG. 3 is a schematic top perspective view of a lighting system for applying a long fixture auto-gradient effect.

FIG. 3 is a schematic top perspective view of a lighting system 300 for applying a long fixture auto-gradient effect across pixels of at least two luminaire. The system 300 has input device 105 connected through connection 106 to controllers of luminaires 310 and 311 having pixels A-B and B-Z, respectively. The controllers and pixels are part of luminaires. The controllers are connected to each of the pixels of each luminaire, such as through an interface. Each of the pixels outputs corresponding light zones A-B and B-Z which illuminate total zone of light 340 from left to right between start frame 341 and end frame 364 of luminaire 310; and between start frame 362 and end frame 342 of luminaire 311. Intermediate pixel B and intermediate light B may be the same end pixel of luminaire 310 and start pixel of luminaire 311. Camera 202 is for imaging frames 341-342 during a scene having a horizontal zone 340 that is illuminated by system 300.

System 300 has distance 361 from the luminaire 310 to first frame 305 at location A1; distance 363 from the luminaires 310 and 311 to intermediate frame 308 at location B1; and distance 365 from the luminaire 311 to second frame 306 at location Z1. Distances 361 and 365 are longer than distance 363. Path 307 leads from frame 305, through frame 308 and to frame 307, such as a path along a wall, screen or flat action area of a three dimensional set or in a scene being illuminated by system 300 during a scene. Camera 202 records the images including frames along path 307 at different distances 361 to 363 to 365 from frame 305 to frame 306.

System 300 is in an air ambient, so light intensity is inversely proportional to the square root of the distance from the pixels to the frame being imaged. With all pixels at the same illumination intensity will be brighter at the frame 306 than at either of frame 305 and 306 because frame 308 is closer to the luminaires than the other two frames. It will also be brighter at frame 306 than frame 305 because frame 306 is closer.

However, system 300 can be used to reduce the illumination (e.g., light intensity or light parameter) gradient from pixel A to pixel B and from pixel Z to pixel B of pixels of the luminaires 310 and 311 proportional to the change in distance from distance 361 to 363 to 364 so that the intensity along path 307 will appear to maintain an even, linear illumination area along the wall, screen or flat action area of the set or scene.

For example, the intensity (light parameters) desired at frames 305, 308 and 306 can be input into input 105 by the user to maintain a constant illumination along path 307. Although one input device 105 is shown for both luminaires, one input can be used for each luminaire.

When the light parameters desired at frames 305 and 308 are received by controller 310, it uses the input parameters to calculate a linear light gradient 350 of light A to light B based on start, end and middle light parameters determined by controller 310 as equation (2):

$$iNp=iAp-((Np-1)*(iAp-iBp)*(1/(Bp-1))) \quad (2):$$

where:
iNp=Intensity of any pixel
iAp=Intensity Pixel A
iBp=Intensity Pixel B
Np=Given pixel
BP=Number Pixel B Also, when the light parameters desired at frames 308 and 306 are received by controller 311, it uses the input parameters to calculate a linear light gradient 351 of light B to light Z based on start, end and middle light parameters determined by controller 311 as equation (3):

$$iN1p=iBp-((N1p-Bp)*(iBp-iZp)*(1/(Zp-Bp))) \quad (3):$$

where:
iN1p=Intensity of any pixel
iBp=Intensity Pixel B
iZ1p=Intensity Pixel Z
N1p=Given pixel
Bp=number of Pixel B
Zp=Last pixel Thus, the controllers are able to interpolate two gradient effects for middle light parameters of middle pixels A+1 to B−1 and middle pixels B+1 to Z−1 based on the light parameters of the pixels A, B and Z.

For one example the user inputs:
Intensity A=100%
Intensity B=25%
Intensity Z=90%
Pixel A=1
Pixel B=5
Pixel Z=12

Thus, for pixel 7, the controller interpolates:

$$\text{Intensity } 7=25\%-((7-5)\times(25\%-90\%\times(1/7)));\text{ or}$$

$$\text{Intensity } 7=25\%-(2\times-9.3\%)=43.57\%$$

For a flat surface such as that along path 370, system 300 provides all the benefits noted above for system 100 or 200.

In some cases, the luminaires 310 and 311 are a single luminaire that extends from pixel A through pixel B and to pixel Z. In this case, the controller may be single controller and the connections to the input may be a single connection. For example, a single luminaire may have a bend at pixel B so that distances 361 and 365 are longer than distance 363.

Figure 4:
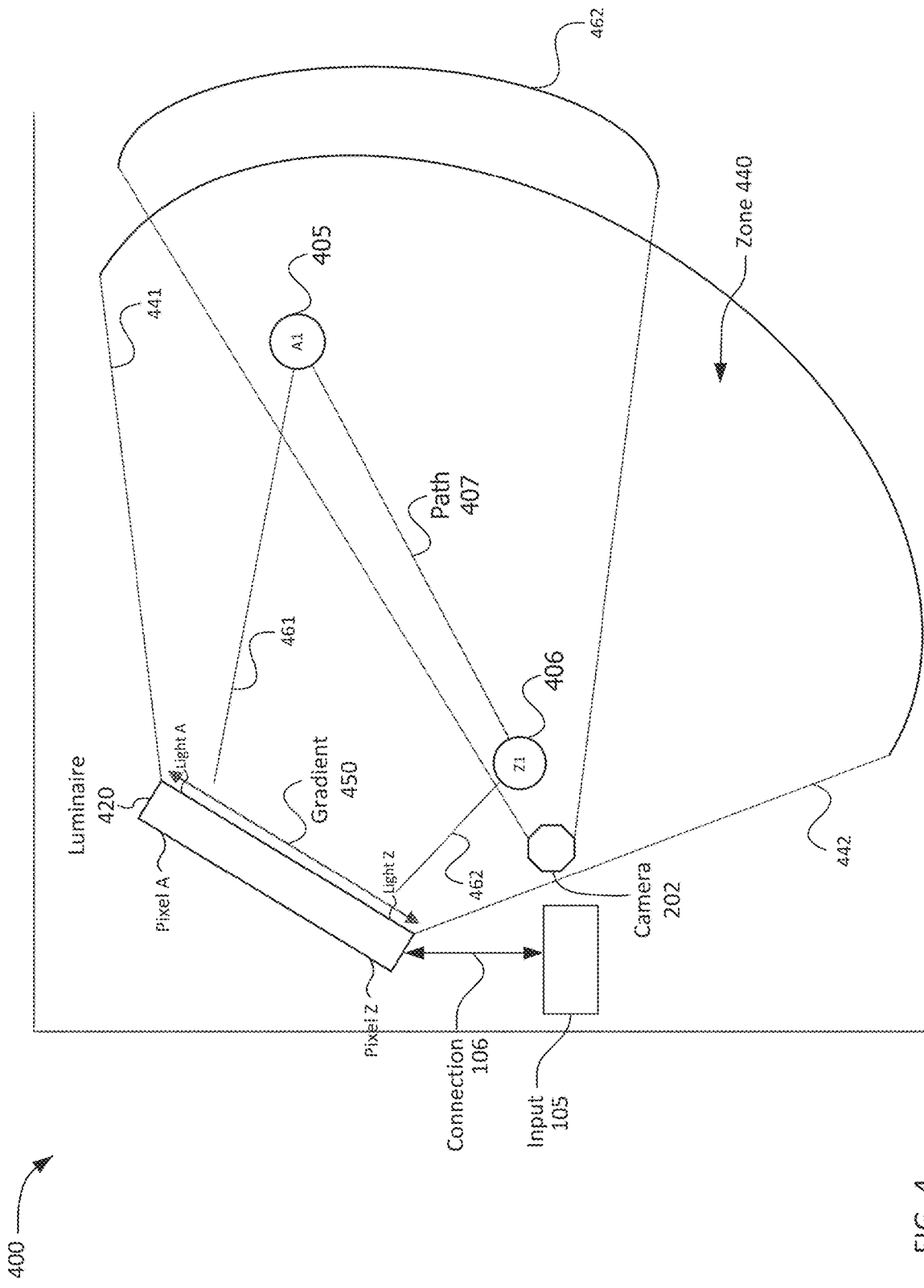
FIG. 4 is a schematic top perspective view of a lighting system for applying a tilt auto-gradient effect.

FIG. 4 is a schematic top perspective view of a lighting system 400 for applying a tilt auto-gradient effect across pixels of at least one luminaire. The system 400 has input device 105 connected through connection 106 to the controller of luminaire 420 having pixels A-Z. Each of the pixels outputs corresponding light zones of light A-Z which illuminates total zone of light 340 from top to bottom between start frame 441 and end frame 442. Camera 202 is for imaging frames 441-442 during a scene having a vertical zone 440 that is illuminated by system 400.

System 400 has distance 461 from the luminaire to first frame 405 at vertical location A1 and distance 462 from the luminaire to second frame 406 at vertical location Z1. Distance 461 is longer than distance 462. Path 407 leads from frame 405 to frame 407, such as a path between two actors an objects A1 and Z1 on a set or in a scene during a three dimensional scene being illuminated by system 400. Camera 202 records the images including frames along path 407 at different distance 461 to frame 405 and distance 462 to frame 406.

In the situation of system 400 which is very common in photography, the physical limitations of the walls and/or ceiling prevent raising the luminaire high enough to place it equidistant between the two subjects at frames 405 and 406. System 400 is in an air ambient, so that with all pixels at the same illumination intensity will be brighter at the frame 406 than at frame 405 because frame 406 is closer to the luminaire than the other frame 405.

However, system 400 can be used to reduce the illumination (e.g., light intensity or light parameter) gradient from pixel A to pixel Z of pixels of the luminaire proportional to the change in distance from distance 461 to distance 462 so that the intensity along path 407 will appear to maintain a constant and equal illumination of the two actors or objects along path 407.

Using a linear gradient such that pixel A is brighter than pixel Z, an actor at frame 406 and actor at frame 405 will appear to be the same brightness. This will look more natural to the camera and human eye. For example, the intensity (light parameters) desired at frames 405 and 406 can be input into input 105 by the user to maintain a constant illumination at both of those frames and along path 307. When these parameters are received by the controller of luminaire 420, it uses the input parameters to calculate a linear light gradient 450 of light A to light Z based on start, end and interpolated middle light parameters determined by controller as noted above for FIG. 2 or 3, but in this case for pixels A-Z oriented in a vertical fashion instead of along a horizontal space.

Thus, the controller is able to interpolate a gradient effect for vertical middle light parameters of middle pixels A+1 to Z−1 based on the parameter of the start pixel A and end pixel Z. Thus, for two actors or objects at the frames 405 and 406 and any frame along path 407, system 400 provides all the benefits noted above for system 100.

System 200, 300 or 400 may be an example implementation of system 100. Systems 200, 300 or 400 may be combined into a system, such as into an embodiment of system 100.

Figure 5A:
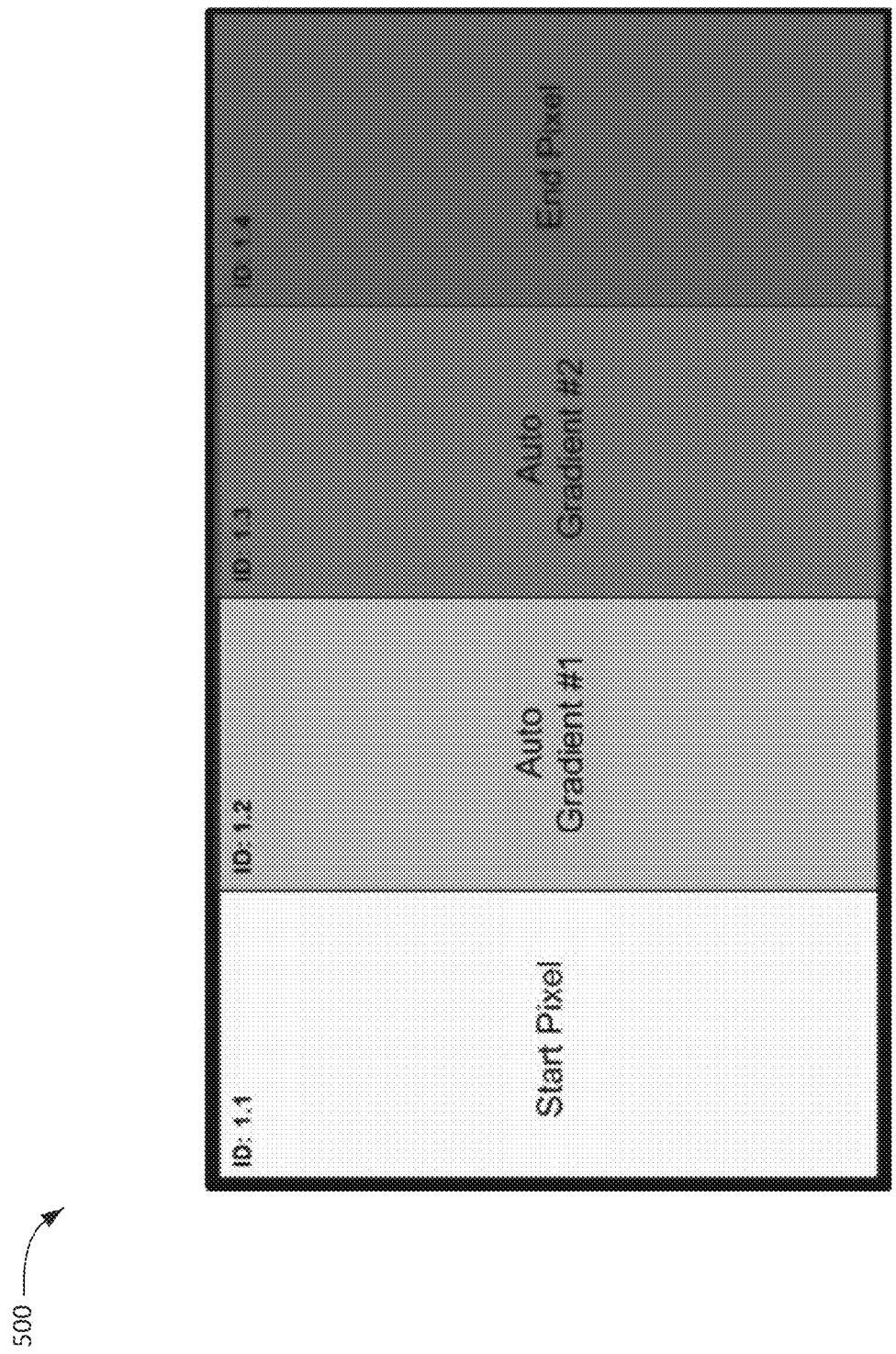
FIG. 5A is a graphical illustration of a light intensity gradient based on the light intensity parameters of the start and end pixels.

FIG. 5A is a graphical illustration of a light intensity gradient 500 including an interpolated gradient effect for middle light intensity parameters of middle pixels based on the light intensity parameters of the start and end pixels. Intensity gradient 500 shows 1 luminaire with 4 pixels. The gradient effect for the middle pixels of gradient 500 may be an intensity interpolation example for middle pixels (here as for pixels 1.2 and 1.3) used for a light parameter of any one of FIGS. 1-4. In the case of gradient 500 the pixels have light intensity parameters as follows:
1.1=100% illumination (pixel A)
1.2=75% illumination (auto calculated)
1.3=50% illumination (auto calculated)
1.4=25% illumination (pixel z)

Figure 5B:
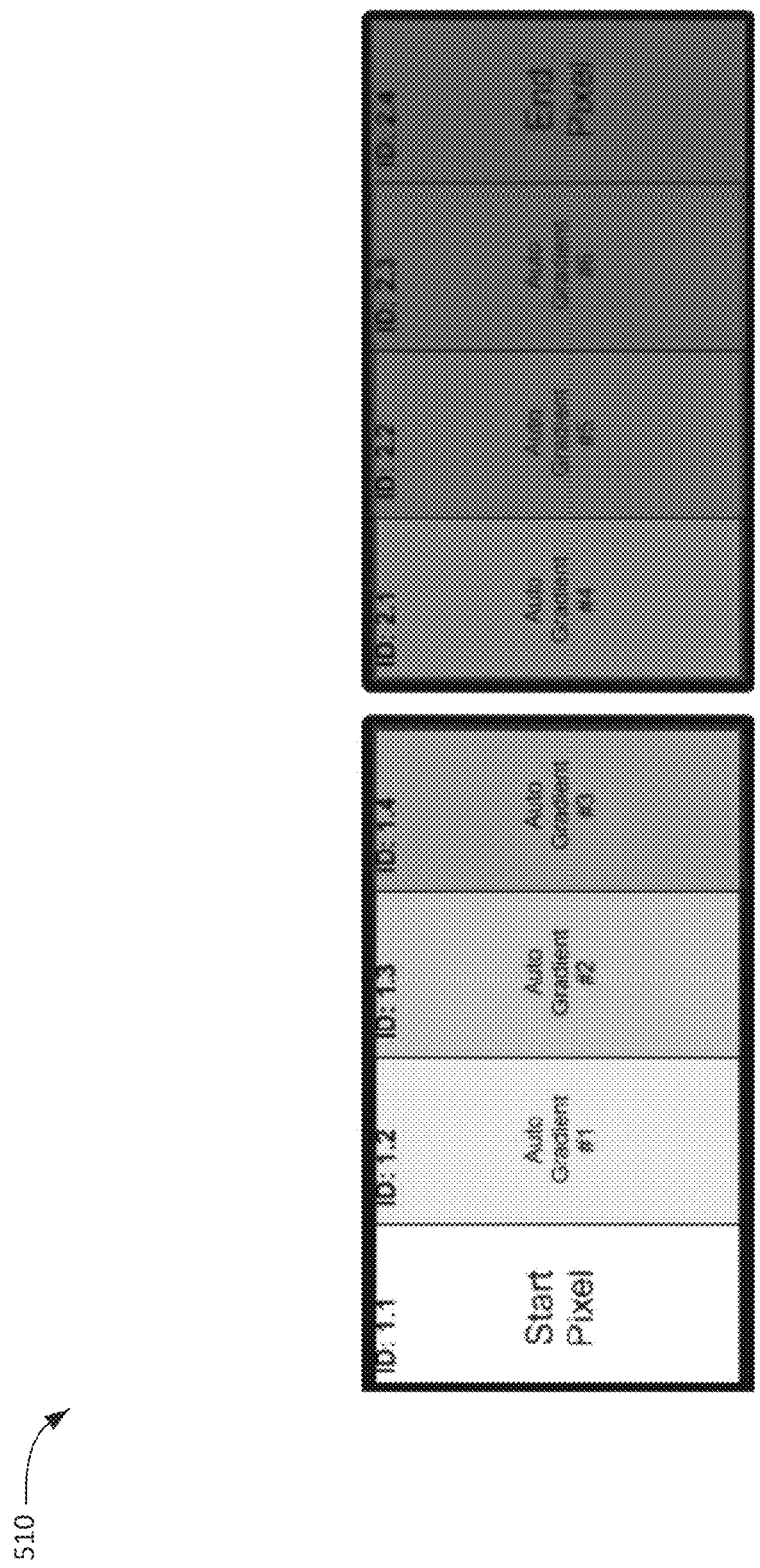
FIG. 5B is a graphical illustration of a second light intensity gradient based on the light intensity parameters of the start and end pixels.

FIG. 5B is a graphical illustration of a second light intensity gradient 510 including an interpolated gradient effect for middle light intensity parameters of middle pixels based on the light intensity parameters of the start and end pixels. Intensity gradient 510 shows 2 luminaires with 4 pixels each. The gradient effect for the middle pixels of gradient 510 may be an intensity interpolation example for middle pixels (here as for pixels 1.2 to 2.3) used for a light parameter of any one of FIGS. 1-4. It may specifically apply the two luminaires of FIG. 3. In the case of gradient 510 the pixels have light intensity parameters as follows:
1.1=100% illumination (pixel A)
1.2=90% illumination (auto calculated)
1.3=80% illumination (auto calculated)
1.4=70% illumination (auto calculated)

2.1=60% illumination (auto calculated)
2.2=50% illumination (auto calculated)
2.3=40% illumination (auto calculated)
2.4=30% illumination (pixel z)

Figure 5C:
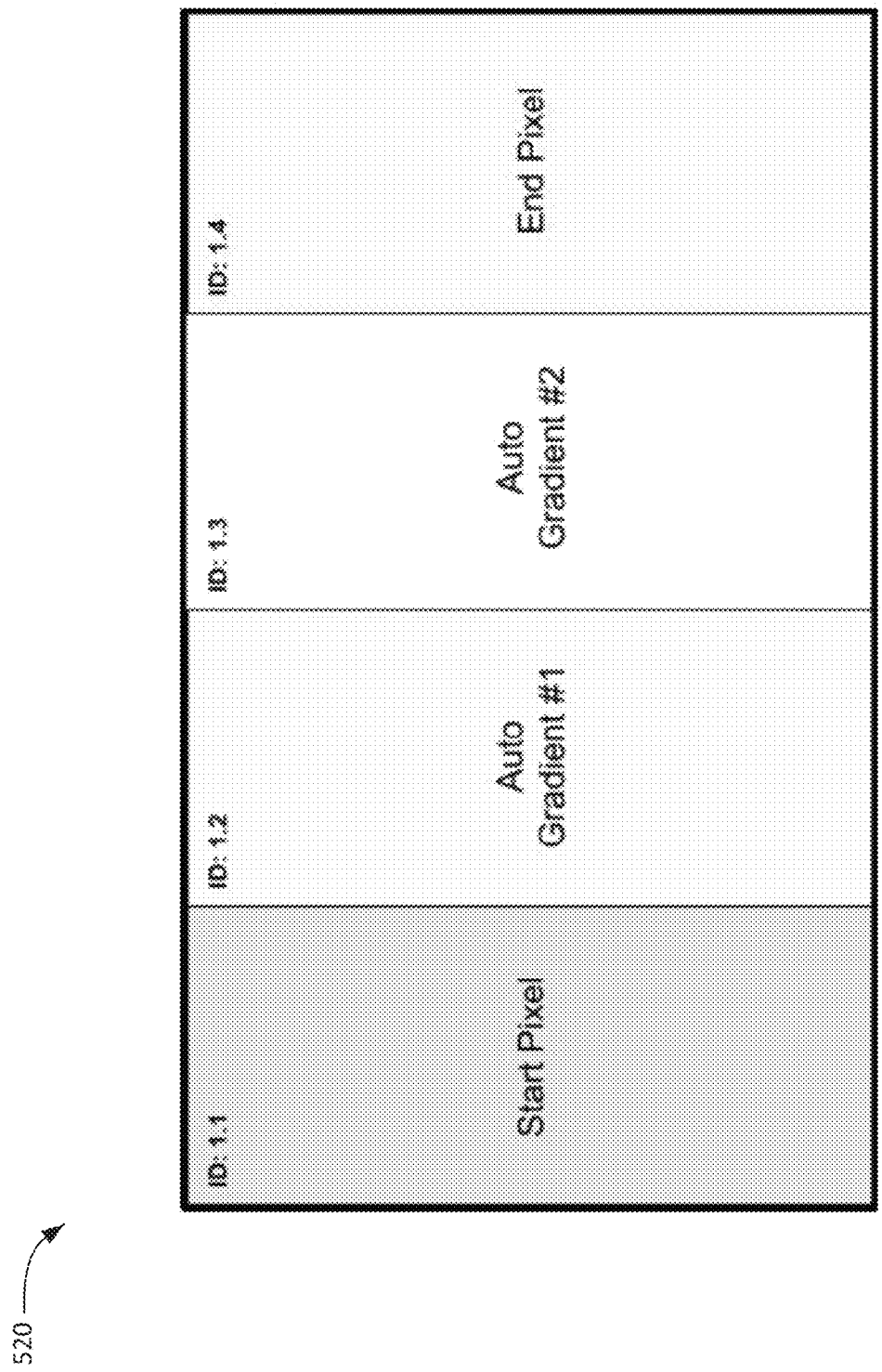
FIG. 5C is a graphical illustration of a correlated color temperature (CCT) gradient based on the light CCT parameters of the start and end pixels.

FIG. 5C is a graphical illustration of a correlated color temperature (CCT) gradient 520 including an interpolated gradient effect for middle light CCT parameters of middle pixels based on the light CCT parameters of the start and end pixels. CCT gradient 520 shows 1 luminaire with 4 pixels. The gradient effect for the middle pixels of gradient 520 may be a CCT interpolation example for middle pixels (here as for pixels 1.2 and 1.3) used for a light parameter of any one of FIGS. 1-4. In the case of gradient 520 the pixels have CCT light parameters that can be beneficial for lighting a scene to be imaged or filmed by a camera.

In one example, the CCT at IDs 1.1 to 1.4 of CCT gradient 520 are useful for filming a scene of a house interior during daytime. Light entering the window from the outside is sunlight (in this solar system) which has a CCT of 5900K midday (varies according to time of day). The Interior of the house may be illuminated by tungsten light bulbs (2700K) (or florescent of 5600K or LED light bulbs of any CCT). A person illuminated mostly by the light from the window (5900K) moves with the camera into the interior of the house where he is lit predominately by the interior light sources, the tungsten light bulbs (2700K). While passing through the transition area (e.g., path 207 or 407), he is lit with a mix of these two sources. A fill light or luminaire could use a CCT gradient 520 to match the natural mix of these two CCT sources at either end, and through the transition area by inputting (e.g., receiving at the controller) light from the window (5900K) as a start light parameter and the interior light (2700K) as the end light parameter for the luminaire so the scene being filmed while the person moves "looks" like more natural lighting to the camera. Using CCT gradient 520 to provide a luminaire that has a CCT gradient to match the natural mix of these two CCT sources as the start and end light parameters, and through the transition area of the middle pixels creates a scene with artificial light that looks more natural to the camera.

In another example, CCT at ID 1.1 is 2000K, CCT at ID 1.4 is 4500K to simulate or enhance the gradient created by the Sun while its setting. In a third example, CCT at ID 1.1 is 3200K, CCT at ID 1.4 6500K to simulate or enhance when an actor is going from indoors (lit by incandescent light) to outdoors (during a sunny day). Thus, using CCT gradient 520 to provide a luminaire that has a CCT gradient to match the natural mix of these two CCT sources as the start and end light parameters, and through the transition area of the middle pixels, creates a scene with artificial light looks like more natural lighting to the camera.

Figure 5D:
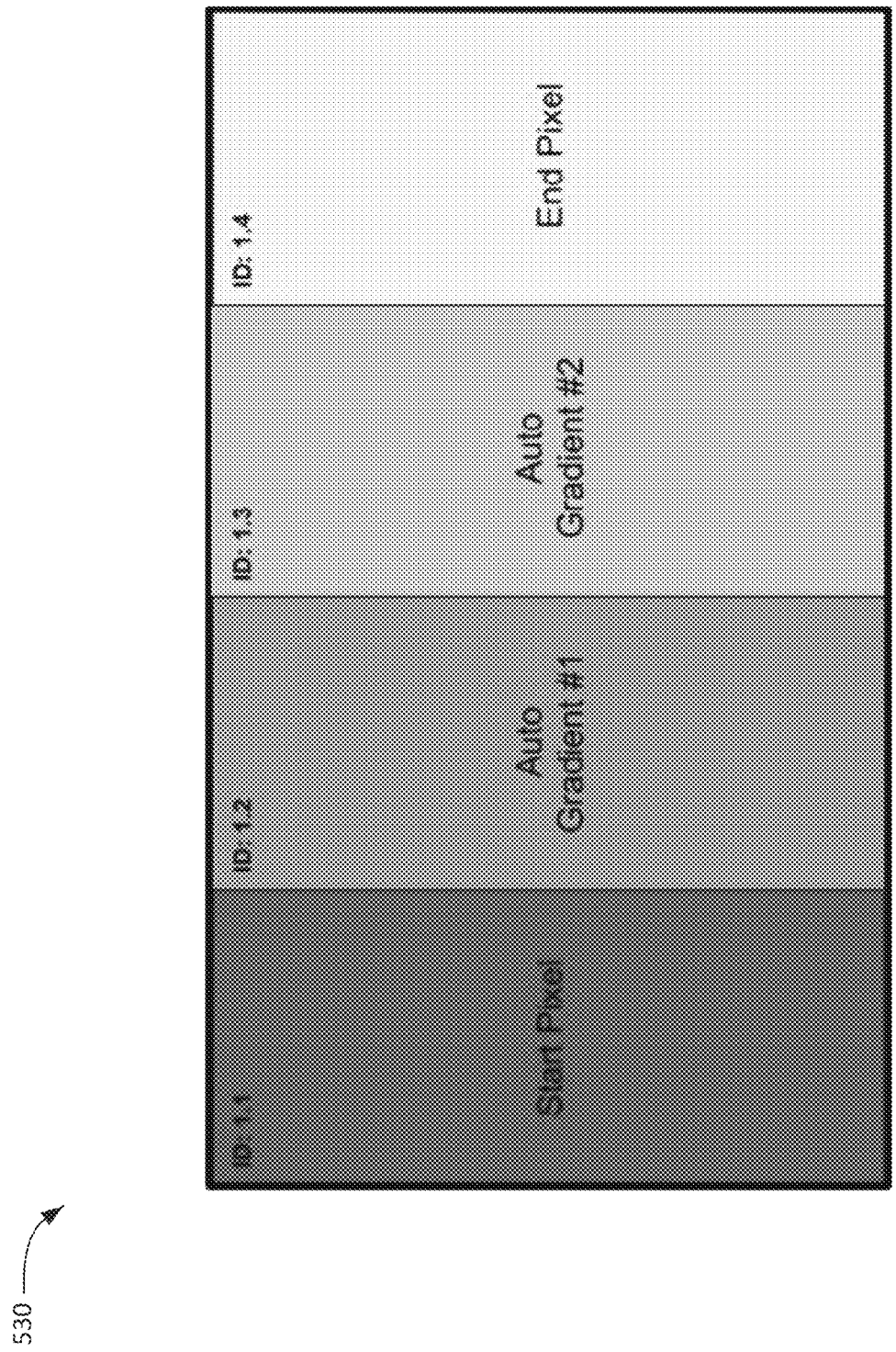
FIG. 5D is a graphical illustration of a saturation gradient based on the light saturation parameters of the start and end pixels.

FIG. 5D is a graphical illustration of a saturation gradient 530 including an interpolated gradient effect for middle light saturation gradient parameters of middle pixels based on the light saturation parameters of the start and end pixels. Saturation gradient 530 shows 1 luminaire with 4 pixels. The gradient effect for the middle pixels of gradient 530 may be a saturation gradient interpolation example for middle pixels (here as for pixels 1.2 and 1.3) used for a light parameter of any one of FIGS. 1-4. In the case of gradient 530 the pixels have saturation gradient light parameters that can be beneficial for lighting a scene to be imaged or filmed by a camera.

In one example, the saturation gradient at IDs 1.1 to 1.4 of CCT gradient 530 are useful for filming a scene of and interior of a spaceship during the daytime on planet in a solar system with a red sun. The light through the ship's view port is predominately Red. Moving from the viewing port (red light) to the ship interior (LED lighting at CCT 5900K to mimic earth sunlight), a fill light using a desaturation gradient could look more natural (or a viewing window into a virus cleansing room illuminated by a strong blue or violet light). In this example, saturation at ID 1.1 is 100% as entered as the start pixel light parameter, saturation at ID 1.4 is 25% as entered as the end pixel light parameter for gradient 530 to simulate or enhance fall-off of color light as the subject moves away from a colored light source. Thus, using gradient 530 to provide a luminaire that has a saturation gradient to match the natural mix of these two saturation sources as the start and end light parameters, and through the transition area of the middle pixels, creates a scene with artificial light looks like more natural lighting to the camera.

Figure 5E:
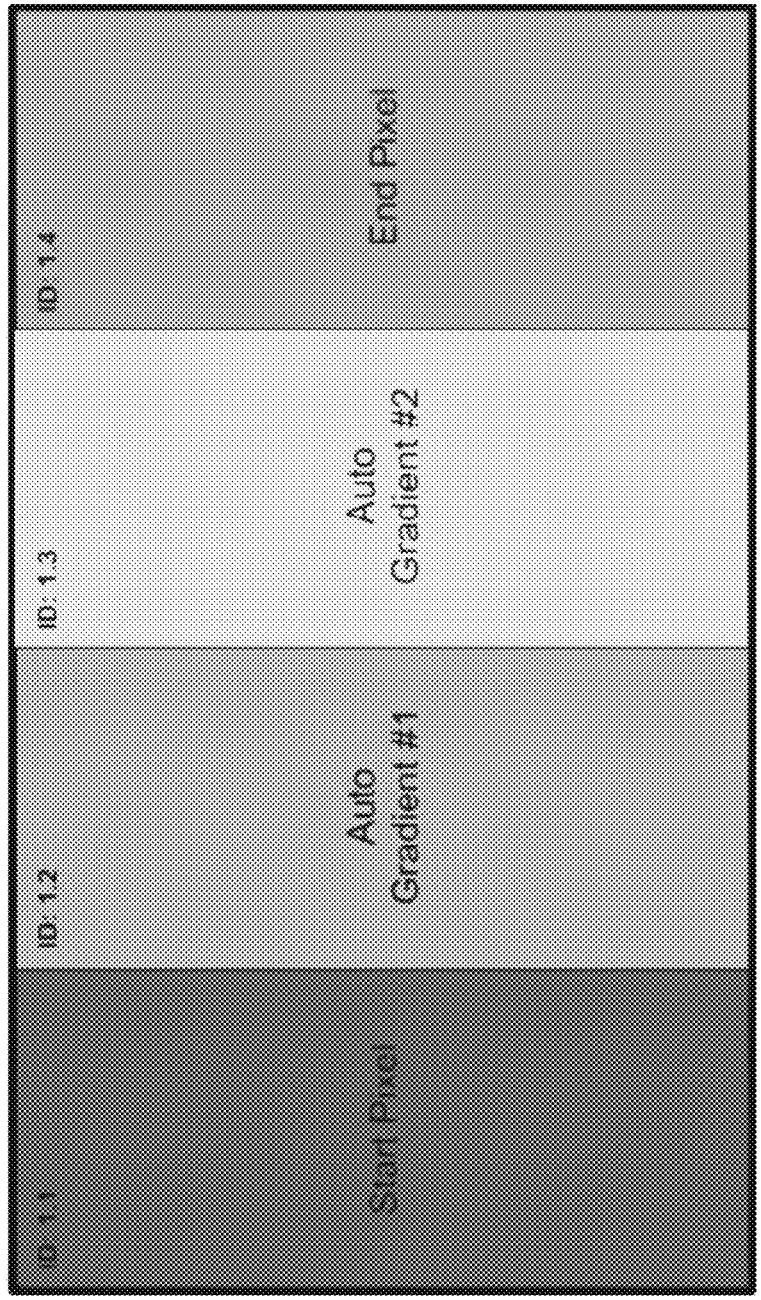
FIG. 5E is a graphical illustration of a hue gradient based on the light hue parameters of the start and end pixels.

FIG. 5E is a graphical illustration of a hue gradient 540 including an interpolated gradient effect for middle light hue gradient parameters of middle pixels based on the light hue parameters of the start and end pixels. Hue gradient 540 shows 1 luminaire with 4 pixels. The gradient effect for the middle pixels of gradient 540 may be a hue gradient interpolation example for middle pixels (here as for pixels 1.2 and 1.3) used for a light parameter of any one of FIGS. 1-4. In the case of gradient 540, the pixels have hue gradient light parameters that can be beneficial for lighting a scene to be imaged or filmed by a camera.

In one example, the hue gradient at IDs 1.1 to 1.4 of gradient 540 are useful for filming a scene of exterior or outside at night on a Las Vegas street where at one location, a casino sign is illuminated with yellow lights, like a circus, and at another location, next door, the sign is illuminated with Red, like a restaurant. The scene being filmed is a reverse angle of a man and woman looking from one to the other, the woman looking predominately yellow, the man predominately red. The scene is being filmed on location, or in a studio setting. Thus, a hue gradient 540 could be used to mimic the light on their faces as they are deciding which way they are going to go during the scene.

In this example, hue value at ID 1.1 is 360° as entered as the start pixel light parameter, and hue value at ID 1.4 is 240° as entered as the end pixel light parameter for gradient 540 to simulate or enhance color lights in a setting similar to Las Vegas or Times Square where multiple colors are being generated by large displays. Thus, using gradient 540 to provide a luminaire that has a hue gradient to match the natural mix of these two hue sources as the start and end light parameters, and through the transition area of the middle pixels, creates a scene with artificial light looks like more natural lighting to the camera.

Figure 5F:
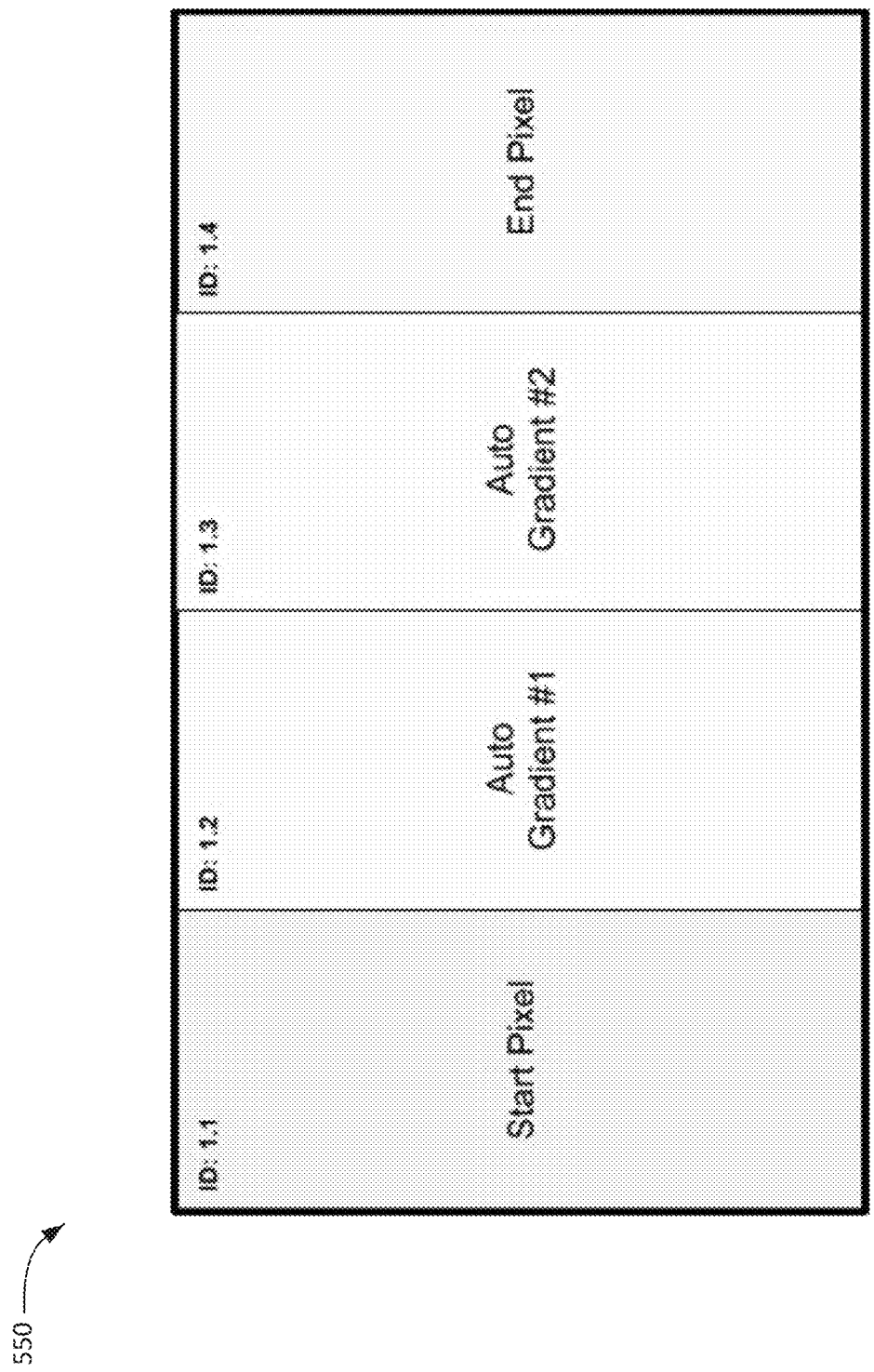
FIG. 5F is a graphical illustration of a tint gradient based on the light tint parameters of the start and end pixels.

FIG. 5F is a graphical illustration of a tint gradient 550 including an interpolated gradient effect for middle light tint gradient parameters of middle pixels based on the light tint parameters of the start and end pixels. Tint gradient 550 shows 1 luminaire with 4 pixels. The gradient effect for the middle pixels of gradient 550 may be a tint gradient interpolation example for middle pixels (here as for pixels 1.2 and 1.3) used for a light parameter of any one of FIGS. 1-4. In the case of gradient 550, the pixels have tint gradient light parameters that can be beneficial for lighting a scene to be imaged or filmed by a camera.

In one example, the tint gradient at IDs 1.1 to 1.4 of gradient 550 are useful for filming a scene of an exterior our outside at Home Depot and to an interior at Home Depot, when a man enters, and looks for a cart. A luminaire using gradient 540 can be used to provide the fill of the illuminated the actors for a combination of sunlight (pure 5900K 0 tint) on one side and the interior of the store, (florescent 5600 k with +5 green tint) common to cheap florescent tubes. By using tint gradient 550, the fill light would look more natural.

In this example, an auto-gradient luminaire using gradient 540 can be setup with tint value for outside is 0 as entered as the end pixel light parameter, and tint value inside is +5 green tint as entered as the start pixel light parameter for gradient 550. Also, the same or another luminaire can be setup with an illumination gradient (e.g., gradient 510) with start parameters of 5900K and inside illumination as the end parameter. Thus, using gradient 550 to provide a luminaire that has a ting gradient to match the natural mix of these two tint sources as the start and end light parameters, and through the transition area of the middle pixels, creates a scene with artificial light looks like more natural lighting to the camera.

In another example, an auto-gradient luminaire using gradients 530 and 540 can be setup with hue input value at ID 1.1 is 360°, saturation at ID 1.1 is 50%; hue value at ID 1.4 is 240°, saturation at ID 1.4 is 20% to simulate or enhance a color scene that uses pastel colors, perhaps the interior of a candy store or yogurt shop.

Thus, using gradients 530 and 540 to provide a luminaire that has saturation and hue gradients to match the natural mix of these two saturation and hue sources as the start and end light parameters, and through the transition area of the middle pixels, creates a scene with artificial light looks like more natural lighting to the camera.

Although the gradients of FIGS. 5A-5F shows a certain number of luminaire with a certain number of pixels, the concept described there may be applied to any number of pixels within any number of luminaire. Any two or more of the gradients of FIGS. 5A to 5F can be combined by a controller to control the pixels of one or more luminaire.

FIG. 6 is a simplified flow chart showing an operating environment or a process 600 for applying an auto-gradient effect across pixels of at least one luminaire. The process 600 may be performed by one or more of systems 100, 200, 300 and/or 400; and may create gradients noted for one or more of FIGS. 5A-E. The process 600 starts at 610 and can end at 660, but the process can also be cyclical as shown by the return arrow and return to 610 after 650. For example, the process may return to be performed multiple times to change the auto-gradient of more than one light parameter and/or of more than one luminaire as desired prior to or during shooting of a scene. In some cases, 650 and 660 are not performed. In some cases, 660 is not performed. Process 600 may be for auto-gradient combinations for pixel compensation, such as to compensate for the artificial light source pixels.

At 610 a predetermined start light parameter for a start pixel of a first luminaire is received. Receiving at 610 may be the controller receiving the start parameter from the input device, such as through a connection.

Prior to receiving at 610, the controller may poll the system to identify luminaires and pixels in each luminaire, such as of an auto-gradient system being used to light a scene. Prior to receiving at 610, a user may have input the start and end predetermined light parameters at an input device that outputs those parameters to the controller. The input device can have a graphical user interface (GUI) that allows the user to set and view the predetermined start and end light parameters.

At 620 a predetermined end light parameter for an end pixel of the first luminaire is received. The predetermined end light parameter may be less than or greater than the predetermined start light parameter. Receiving at 620 may be the controller receiving the end parameter from the input device, such as through a connection.

Although 610 is shown before 620, they may occur in either order, or simultaneously. The start and end light parameters received may be one or more of light intensity, color temperature, CCT, saturation, hue, and/or tint.

At 630 a gradient effect for a middle light parameter of each of a plurality of middle pixels of the first luminaire is automatically interpolated based on the start predetermined light parameter and the end predetermined light parameter. Automatically interpolating at 630 may be the controller automatically interpolating based on or using the start and end parameters received at 610 and 620. At 630 the middle light parameters may be automatically and simultaneously calculated by electronic circuitry and/or logic circuitry of the controller prior to outputting the control signals at 640. Automatically interpolating at 630 may be based on a weight for each middle pixel, a mathematical function or an algorithm. Interpolating at 630 may include interpolating a gradient effect for middle pixel light parameters that are light intensity, color temperature, CCT, saturation, hue and/or tint gradient parameters of middle pixels based on the light intensity, color temperature, CCT, saturation, hue and/or tint parameters based on the parameters of the start and end pixels.

Automatically interpolating at 630 may include equations and/or descriptions at FIGS. 1-5F, such as for any number of the light parameters. The gradient effect may be an average change across each of the middle pixels of the luminaire from the start predetermined light parameter to the end predetermined light parameter. The gradient effect for the middle light parameter of each of the plurality of middle pixels may be automatically interpolated to provide equality of the light parameters to a person walking along a path, a flat surface along the path, or two subjects along the path, such as where two ends of the path are not equidistant from the luminaire.

In some cases, at 630 an algorithm is used to compensate one or more the light parameters in three-dimensional space from pixel A to Z with the linear algorithm, such as of equation (1), (2) and/or (3). In other cases, automatically interpolating at 630 may be or include interpolating a gradient of the light parameter(s) for the middle pixels with a mathematical function or equation similar to equation (1) but using non-linear, curves, radii, S-curves, exponential, and/or logarithmic gradients based on the start predetermined light parameter and the end predetermined light parameter.

For example, interpolating at 630, can be not only interpolating the intensity (light brightness) gradients, but also CCT (warm white to cool white) and Color gradients. Typically, as light fills three-dimensional space of a scene, the effects of the source illuminations (e.g., pixels) are stuck to the physical limitations of being inversely proportional to the square of the distance to the object being illuminated (inverse square law). Most soft light sources or luminaire are flat as constrained by the limitations of materials. But natural light is not so constrained. However, the various types of auto-gradient interpolated at 630 are configured so that as light fills three-dimensional space of the scene from the luminaire (e.g., controlled pixels), it can mimic natural sources, such as sunlight on clouds, non-linear gradients, spherical gradients, and overlying combinations thereof etc. Interpolate at 630 includes interpolating gradients of one or more luminaire so that they can be used and combined to change the way movies sets are lit on stages. In one case, interpolating at 630 is interpolating radial gradients on a large array of pixels by designating light parameters on pixel A at the center of the array and assigning light parameters on pixels at the periphery of the array as pixel Z1-Zn and allowing the controller to set the parameters for all middle and intermediate pixels in the array from A-Z1 to A-Zn to be set in a radial pattern. The value of each of pixel Z1-Zn may be different and thus each set of middle and intermediate pixels in the array from A-Z1 to A-Zn may be different. In this case, using the auto-gradient interpolated at 630 provides a much more efficient, cheaper and economic way to control the gradients of the luminaire.

Light intensity on an object and its subsequent effect on the image sensor or a camera, is subject to the "Inverse Square Law" where illuminance decreases by the square of the distance from the source. Illuminance=Point of illumination/distance squared. A bare light bulb emits a sphere of illuminance. The area of this sphere is 4×Pi x radius squared, where the distance from source of illumination is a radius. Illuminating a flat surface (e.g., see FIG. 3) therefore would make the center brighter than the four corners because the radius (distance) from the source is longer. Illuminating a flat surface from a single source is a problem. The frame of the camera is rectangular. A photo of this flat surface would "vignette" in the corners as there would be a reduction of an image's brightness or saturation toward the periphery compared to the image center. By curving multiple pixel illuminators, an auto-gradient intensity can be created that increases the brightness times the difference in distance from the center squared to solve this problem. For instance, the start light parameter could be the intensity of the source bulb, and multiple luminaires could be setup as spokes radiating outwards to each corner of the rectangle shape with end light parameters the are the source intensity minus the intensity of the source at the corners of the shape, thus, lighting the flat surface with a constant equal illumination intensity.

Similarly, this idea of illuminating a "flat surface" could apply to an area of space through with an actor is to walk. For example, the actor walking at an angle to the light source (e.g., see FIGS. 2 and 4). Where he is closer to the source, he will appear brighter. Using an intensity auto-gradient set accordingly the difference from the light source to the actor could maintain an even exposure—and mimic the natural light, sunlight or moonlight. The Sun and Moon are so far from the Earth that the slight change in distance of a few hundred yard is not detectible to the camera. An artificial light source is much, much closer, so intensity gradients are required for artificial lighting to mimic natural sources.

At 640 control signals having the start, end and middle light parameters are output to the start, end and middle light pixels, respectively. Outputting at 640 may be the controller outputting these parameters to the interface device, such as through a connection. Outputting at 640 may include the interface outputting these parameters to or using these parameters to control the light of the corresponding start, end and middle light pixels.

At 650 a scene with the start, end and middle light pixels using the start, end and middle light parameters is illuminated. Illuminating at 650 may include the start, end and middle light pixels outputting light or light zones based on the control signals and/or light parameters output at 640.

Illuminating at 650 may be changing an illumination of a scene illuminated using the start, end and middle light pixels base on the start, end and middle light parameters. Illuminating at 650 may include changing an amount of electrical power sent to the start, end and middle light pixels based on the start, end and middle light parameters.

In some cases, 610 to 650 are performed by a luminaire device that includes the controller, interface and pixels. The luminaire device may be an LED strip, an LED panel, an LED string or an LED panel. It may have multiple pixels equally spaced along a line, each pixel having one or more LEDs of the colors red, green, blue (RGB), amber (A), cool white and/or warm white.

At 660 a camera records the illuminated scene, such as by imaging the frames in the scene over time.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A luminaire adapted to apply an auto-gradient effect across pixels of the luminaire, the luminaire comprising:
    an interface coupled by a connection to a controller, the controller has electronic circuitry for:
        receiving a predetermined start light parameter for a start pixel of a first luminaire;
        receiving a predetermined end light parameter for an end pixel of the first luminaire, the predetermined end light parameter greater than the predetermined start light parameter;
        automatically interpolating a gradient effect for a middle light parameter of each of a plurality of middle pixels of the first luminaire based on the start predetermined light parameter and the end predetermined light parameter; and
        outputting control signals having the start, end and middle light parameters to the start, end and middle light pixels, respectively, through the connection and to the interface.

2. The luminaire of claim 1, further comprising:
    the start, end and middle light pixels coupled to the interface;
    the start, end and middle light pixels for illuminating a scene with the start, end and middle light parameters, wherein the luminaire is one of a LED strip or an LED string; and wherein each pixel has at least one LED.

3. The luminaire of claim 1, wherein the gradient effect is an average light intensity change across each of the plurality of middle pixels of the luminaire from the start predetermined light parameter to the end predetermined light parameter.

4. The luminaire of claim 1, wherein the start, end and middle light parameters are all one of a light intensity, color temperature, saturation, hue, or tint.

5. The luminaire of claim 1, wherein the controller is located in the luminaire and is not a full pixel controller; and wherein the controller electronic circuitry includes logic circuitry for automatically and simultaneously calculating the middle light parameters prior to outputting the control signals.

6. The luminaire of claim 1, further comprising an input device for:

receiving the predetermined start light parameter from a user;

outputting the predetermined start light parameter to the controller;

receiving the predetermined end light parameter from the user; and outputting the predetermined end light parameter to the controller.

7. The luminaire of claim 6, wherein the input device has a graphical user interface (GUI) that allows the user to set and view the predetermined start and end light parameters.

8. The luminaire of claim 1, the controller electronic circuitry further for:

receiving a predetermined intermediate light parameter for an intermediate pixel of the first luminaire; the predetermined intermediate light parameter less than the start and less than the end predetermined light parameters;

automatically interpolating a first gradient effect for a middle light parameter of each of a first plurality of middle pixels of the first luminaire that are between the start pixel and the intermediate pixel based on the start predetermined light parameter and the intermediate predetermined light parameter;

automatically interpolating a second gradient effect for a middle light parameter of each of a second plurality of middle pixels of the first luminaire that are between the intermediate pixel and the end pixel based on the intermediate predetermined light parameter and the end predetermined light parameter;

outputting first control signals having the start, intermediate and first middle light parameters to the start, intermediate and first middle light pixels, respectively, through the connection and to the interface; and outputting second control signals having the end and second middle light parameters to the end and second middle light pixels, respectively, through the connection and to the interface.

9. The luminaire of claim 1, wherein the gradient effect for the middle light parameter of each of the plurality of middle pixels is automatically interpolated to provide equal illumination to one of:

a person walking along a path; a flat surface along the path, or two subjects along the path; wherein ends of the path are not equidistant from the luminaire.

10. A system for applying an auto-gradient effect across pixels of at least two luminaire, the system comprising:

a first luminaire having a first interface coupled by a first connection to a first controller, the first controller has first electronic circuitry for:

receiving a predetermined start light parameter for a start pixel of a first luminaire;

receiving a predetermined intermediate light parameter for an end pixel of the first luminaire, the predetermined intermediate end light parameter greater than the predetermined start light parameter;

automatically interpolating a first gradient effect for a middle light parameter of each of a plurality of middle pixels of the first luminaire based on the start predetermined light parameter and the intermediate predetermined light parameter; and outputting control signals having the start, intermediate and middle light parameters to the start, end and middle light pixels of the first luminaire, respectively, through the first connection and to the first interface;

a second luminaire having a second interface coupled by a second connection to a second controller, the second controller has second electronic circuitry for:

receiving the predetermined intermediate light parameter for a start pixel of a second luminaire;

receiving a predetermined end light parameter for an end pixel of the second luminaire, the predetermined intermediate end light parameter less than the predetermined start light parameter;

automatically interpolating a second gradient effect for a middle light parameter of each of a plurality of middle pixels of the second luminaire based on the intermediate predetermined light parameter and the end predetermined light parameter; and outputting control signals having the intermediate, end and middle light parameters to the start, end and middle light pixels of the second luminaire, respectively, through the second connection and to the second interface.

11. The system of claim 10, the first luminaire further comprising:

the start, end and middle light pixels of the first luminaire coupled to the interface and for illuminating a scene with the start, intermediate and middle light parameters of the first luminaire;

the second luminaire further comprising:

the start, end and middle light pixels of the second luminaire coupled to the interface and for illuminating the scene with the end, intermediate and middle light parameters of the second luminaire;

the system further comprising a camera for recording the illuminated scene;

wherein the first and second luminaire are one of a LED strip, an LED panel, or an LED string;

wherein each pixel has at least three LEDs that include red, green, blue and amber LED emitters;

wherein the plurality of middle pixels are at least 5 middle pixels.

12. The system of claim 10, further comprising an input device coupled to the first and second luminaire for:

receiving the predetermined start light parameter from a user;

outputting the predetermined start light parameter to the first controller;

receiving the predetermined intermediate light parameter from the user;

outputting the predetermined intermediate light parameter to the first and second controller;

receiving the predetermined end light parameter from the user; and outputting the predetermined end light parameter to the second controller.

13. A method for applying an auto-gradient effect across pixels of at least one luminaire, the method comprising:

receiving a predetermined start light parameter for a start pixel of a first luminaire;

receiving a predetermined end light parameter for an end pixel of the first luminaire, the predetermined end light parameter greater than the predetermined start light parameter;

automatically interpolating a gradient effect for a middle light parameter of each of a plurality of middle pixels of the first luminaire based on the start predetermined light parameter and the end predetermined light parameter; and outputting control signals having the start, end and middle light parameters to the start, end and middle light pixels, respectively.

14. The method of claim 13, further comprising:

illuminating a scene with the start, end and middle light pixels using the start, end and middle light parameters; and recording the illuminated scene with a camera.

15. The method of claim 14, wherein interpolating, outputting and illuminating are performed by the same device;

wherein the device is one of a LED strip, an LED panel, or an LED string; and wherein each pixel has at least one LED.

16. The method of claim 13, further comprising:

changing an illumination of a scene illuminated using the start, end and middle light pixels base on the start, end and middle light parameters; and recording the changed illuminated scene with a camera.

17. The method of claim 13, wherein the gradient effect is an average light intensity change across each of the plurality of middle pixels of the luminaire from the start predetermined light parameter to the end predetermined light parameter.

18. The method of claim 13, wherein the start, end and middle light parameters are all one of a light intensity, color temperature, saturation, hue, or tint.

19. The method of claim 13, wherein the method is performed by a controller in the luminaire that is not a full pixel controller; and wherein the middle light parameters are automatically and simultaneously calculated by logic circuitry of the controller prior to outputting the control signals.

20. The method of claim 13, further comprising:

the controller polling the system to identify luminaires and pixels in each luminaire:

receiving the predetermined start light parameter from a user at an input device;

outputting the predetermined start light parameter to the controller;

receiving the predetermined end light parameter from the user at the input device; and outputting the predetermined end light parameter to the controller.

21. The method of claim 13, further comprising:

receiving a predetermined intermediate light parameter for an intermediate pixel of the first luminaire; the predetermined intermediate light parameter less than the start and less than the end predetermined light parameters;

automatically interpolating a first gradient effect for a middle light parameter of each of a first plurality of middle pixels of the first luminaire that are between the start pixel and the intermediate pixel based on the start predetermined light parameter and the intermediate predetermined light parameter;

automatically interpolating a second gradient effect for a middle light parameter of each of a second plurality of middle pixels of the first luminaire that are between the intermediate pixel and the end pixel based on the intermediate predetermined light parameter and the end predetermined light parameter;

outputting first control signals having the start, intermediate and first middle light parameters to the start, intermediate and first middle light pixels, respectively; and outputting second control signals having the end and second middle light parameters to the end and second middle light pixels, respectively.

22. The method of claim 13, wherein the gradient effect for the middle light parameter of each of the plurality of middle pixels is automatically interpolated to provide equal illumination to one of:

a person walking along a path; a flat surface along the path, or two subjects along the path; wherein two ends of the path are not equidistant from the luminaire.

23. The method of claim 13, further comprising:

illuminating a scene by changing an amount of electrical power sent to the start, end and middle light pixels with the start, end and middle light parameters.

* * * * *